US012768990B2

(12) United States Patent
Xu et al.

(10) Patent No.: US 12,768,990 B2
(45) Date of Patent: Oct. 20, 2026

(54) DUAL-OPTICAL FUSION LASER RANGEFINDER

(71) Applicant: SNDWAY TECHNOLOGY (GUANGDONG) CO., LTD., Dongguan (CN)

(72) Inventors: Xiaojian Xu, Dongguan (CN); Gang He, Dongguan (CN)

(73) Assignee: SNDWAY TECHNOLOGY (GUANGDONG) CO., LTD., Dongguan (CN)

( * ) Notice: Subject to any disclaimer, the term of this patent is extended or adjusted under 35 U.S.C. 154(b) by 297 days.

(21) Appl. No.: 18/789,813

(22) Filed: Jul. 31, 2024

(65) Prior Publication Data

US 2025/0208290 A1 Jun. 26, 2025

(30) Foreign Application Priority Data

Dec. 20, 2023 (CN) ........................ 202311758910.1

(51) Int. Cl.

| | |
|---|---|
| ***G01S 17/32*** | (2020.01) |
| ***G01S 7/481*** | (2006.01) |
| ***G01S 7/484*** | (2006.01) |
| ***G01S 7/51*** | (2006.01) |
| ***G01S 17/10*** | (2020.01) |
| ***G01S 17/86*** | (2020.01) |
| *G06F 3/041* | (2006.01) |

(52) U.S. Cl.
CPC ............ *G01S 17/32* (2013.01); *G01S 7/4813* (2013.01); *G01S 7/484* (2013.01); *G01S 7/51* (2013.01); *G01S 17/10* (2013.01); *G01S 17/86* (2020.01); *G06F 3/041* (2013.01)

(58) Field of Classification Search
None
See application file for complete search history.

(56) References Cited

FOREIGN PATENT DOCUMENTS

| | | | | | |
|---|---|---|---|---|---|
| CN | 109324334 A | * | 2/2019 | ............. | G01S 17/08 |
| CN | 208704711 U | * | 4/2019 | | |
| CN | 111812665 A | * | 10/2020 | ............. | G01S 7/481 |
| WO | WO-2019052618 A2 | * | 3/2019 | ............. | G01B 11/02 |

* cited by examiner

*Primary Examiner* — Hovhannes Baghdasaryan
(74) *Attorney, Agent, or Firm* — Hemisphere Law, PLLC

(57) ABSTRACT

A dual-optical fusion laser rangefinder includes: a square housing, an optical core assembly, a protective lens, a touch control display module and a button control board. The optical core assembly and button control board are disposed in the square housing. The protective lens configured to transmit emitted and received lights is located at a front end of the square housing and corresponds to the optical core assembly. The touch control display module is disposed on the square housing and is connected to the button control board. The button control board is in control connection with the optical core assembly. The optical core assembly includes a phase laser ranging optical path unit and a pulse laser ranging optical path unit. The rangefinder can measure distances from 0.2 m to 5000 m and ensure that accuracy reaches the millimeter level within 200 m by integrating pulse laser ranging and phase laser ranging optics.

8 Claims, 5 Drawing Sheets

DUAL-OPTICAL FUSION LASER RANGEFINDER

TECHNICAL FIELD

The disclosure relates to the field of laser measurement technologies, and particularly to a dual-optical fusion laser rangefinder.

BACKGROUND

Existing laser rangefinders include pulse laser rangefinders and phase laser rangefinders. The pulse laser rangefinders can measure distances from 3 meter (m) to 5000 m, but their measurement accuracy is not high, with an error of +1 m at 100 m, and the error tends to increase as the measurement distance becomes longer. The phase laser rangefinders can measure distances from 0.2 m to 200 m and offer high measurement accuracy, with an error of ±2 millimeter (mm) at 10 m. However, as with the pulse laser rangefinders, the error of the phase laser rangefinders also tends to increase with the measurement distance becoming longer, and the phase laser rangefinders cannot measure as far as the pulse laser rangefinders. Currently, there is no rangefinder on the market that can measure long distances while also ensuring millimeter-level accuracy.

SUMMARY

1. Technical Problems to be Solved

In response to existing technical problems, the present disclosure provides a dual-optical fusion laser rangefinder, which is capable not only of measuring long distances but also ensuring an accuracy up to the millimeter level.

2. Technical Solution

In order to achieve purpose above, the present disclosure mainly includes the following technical solutions.

A dual-optical fusion laser rangefinder, includes:

a square housing, an optical core assembly, a protective lens, a touch control display module and a button control board;

the optical core assembly and the button control board are located in the square housing;

the protective lens is located at a front end of the square housing, and positioned corresponding to the optical core assembly; and the protective lens is configured to transmit emitted lights and received lights;

the touch control display module is disposed on the square housing and is connected to the button control board;

the button control board is in control connection with the optical core assembly; and the optical core assembly includes a phase laser ranging optical path unit and a pulse laser ranging optical path unit.

In an embodiment, the optical core assembly includes an optical bracket, a main control board, the phase laser ranging optical path unit and the pulse laser ranging optical path unit;

the optical bracket is disposed on the main control board;

the phase laser ranging optical path unit is located at a right side of the optical bracket;

where the phase laser ranging optical path unit includes: a phase reception mirror, a filter bracket, an optical filter, a phase laser emitter and a phase receiver;

the phase reception mirror is fixed on a position of the main control board, which is located at a right side of a front end of the optical bracket;

the optical filter is fixed in a filter bracket groove defined on the filter bracket, and the filter bracket is pressed into an optical bracket groove defined on the optical bracket;

the phase laser emitter is fixed in a phase laser emitter installment hole defined on the optical bracket;

the phase receiver is attached to a rear end of the optical bracket; and the phase laser emitter and the phase receiver are in control connection with the main control board.

In an embodiment, the phase laser emitter is configured to emit a laser to a surface to be measured, to thereby enable the surface to be measured to diffusely reflect the laser onto a surface of the phase reception mirror; the phase reception mirror is configured to focus the laser and transmit the laser to the optical filter; and the phase receiver is configured to receive the laser penetrating the optical filter, transform the laser to an electrical signal, and transmit the electrical signal to the main control board for controlling.

In an embodiment, the phase laser emitter is configured to emit visible green lights with wavelengths in a range of 500 nanometer (nm) to 535 nm or visible red lights with wavelengths in a range of 630 nm to 670 nm; and a wavelength of the optical filter is in a range of 500 nm to 535 nm or in a range of 630 nm to 670 nm.

In an embodiment, the pulse laser ranging optical path unit is located at a left side of the optical bracket;

the pulse laser ranging optical path unit includes: a pulse laser emitter, a reflection mirror, a pulse receiver, a pulse reception mirror and a pulse receiver;

the pulse reception mirror is fixed on a position of the main control board, which is located at a left side of the front end of the optical bracket;

the pulse laser emitter is fixed in a pulse laser emitter installment hole defined on the optical bracket;

the reflection mirror is fixed on a 45-degree inclined edge of the optical bracket; and the pulse receiver is fixed on the left side of the optical bracket.

In an embodiment, the pulse laser emitter is configured to emit a laser to the surface to be measured, to thereby enable the surface to be measured to diffusely reflect the laser onto a surface of the pulse reception mirror; the pulse reception mirror is configured to focus the laser and transmit the laser to the reflection mirror; the reflection mirror is configured to reflect the laser at a 45-degree angle onto a surface of the pulse receiver; and the pulse receiver is configured to transform the laser to an electrical signal and transmit the electrical signal to the main control board for controlling; and the pulse laser emitter is configured to emit invisible lights with a wavelength of 905 nm.

In an embodiment, a camera is provided on an edge of the optical bracket, which is closed to the phase laser emitter when a ranging distance is long;

the camera is capable of capturing laser points with long distances; and an inner light knob adjustment valve and an inner laser tube are arranged on the optical bracket.

In an embodiment, the protective lens defines a pulse reception transparent area, a pulse emission transparent area, a phase emission transparent area, a camera transparent and a phase reception transparent area.

In an embodiment, the square housing includes: a bottom shell, a front shell, a metal cover and a universal serial bus (USB) protective cover;

the optical core assembly is fixed in the bottom shell through optical core assembly lock screws;

the button control board is fixed in the front shell through button control board lock screws;

the metal cover is fixed on a rear end of the front shell through screws;

the USB protective cover is fixed on the metal cover fixed on the rear end of the front shell;

the touch control display module is fixed on a surface of the front shell; and the protective lens is fixed on a front end of the front shell.

In an embodiment, the dual-optical fusion laser rangefinder further includes a lithium (Li) battery; and the lithium battery is fixed on the main control board and is configured to provide a power source for the optical core assembly and the touch control display module.

3. Beneficial Effects

The dual-optical fusion laser rangefinder provided by the present disclosure has the following beneficial effects.

This rangefinder is capable of integrating pulse laser ranging and phase laser ranging optics, ensuring the ability to measure distances from 0.2 m to 5000 m on a single device. It also guarantees that the accuracy reaches the millimeter level within 200 m. Particularly in terms of structure, by integrating the two optical systems, the product's volume is compact, providing users with an enhanced experience.

DESCRIPTION OF REFERENCE NUMERALS

1 bottom shell; 2 lithium battery;

3 optical core assembly; 301 optical bracket; 302 pulse reception mirror; 303 phase reception mirror; 304 filter bracket; 305 optical filter; 306 phase laser emitter; 307 phase receiver; 308 camera; 309 main control board; 310 pulse laser emitter; 311 reflection mirror; 312 pulse receiver; 313 inner light knob adjustment valve; 314 surface to be measured; 315 filter bracket groove; 316 optical bracket groove; 317 phase laser emitter installment hole; 318 pulse laser emitter installment hole; 319 45-degree inclined edge; 320 inner laser tube;

4 protective lens; 401 pulse reception transparent area; 402 pulse emission transparent area; 403 phase emission transparent area; 404 camera transparent area; 405 phase reception transparent area;

5 touch control display module; 6 front shell; 7 button; 8 metal cover; 9 screw; 10 USB protective cover; 11 button control board; 12 bottom shell lock screw; 13 button control board lock screw; 14 optical core assembly lock screw.

DETAILED DESCRIPTION OF EMBODIMENTS

In order to better explain the present disclosure for the purpose of understanding, the present disclosure is described in detail through specific embodiments with reference to the accompanying drawings.

Figure 1:
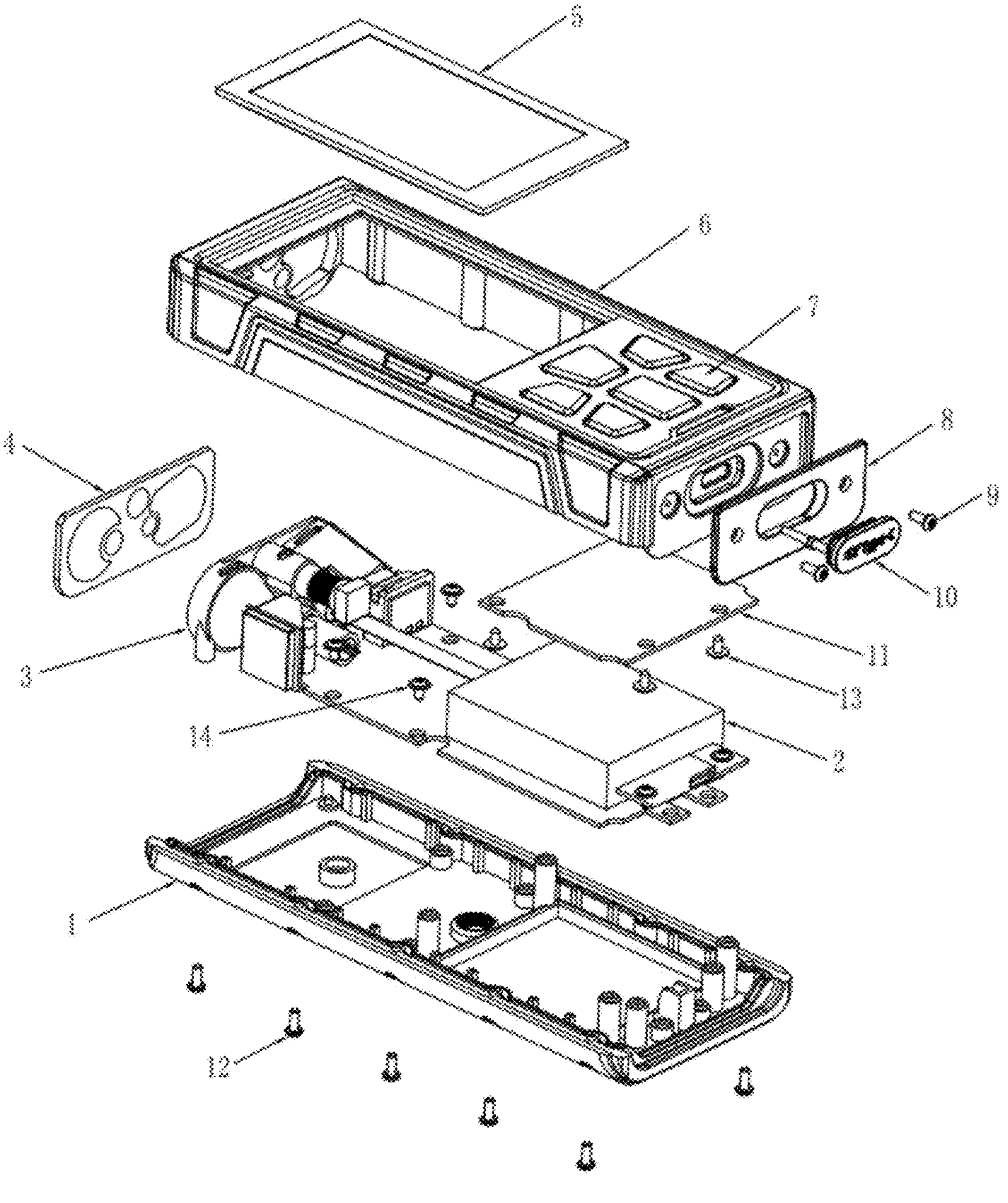
FIG. 1 illustrates an exploded view of an overall structure of the dual-optical fusion rangefinder of the present disclosure.
Figure 2:
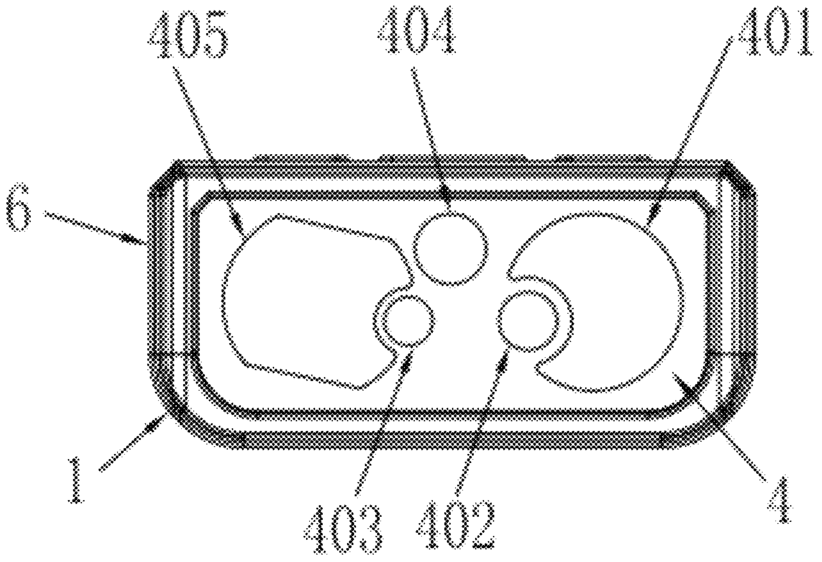
FIG. 2 illustrates a schematic structural diagram of a protective lens of the dual-optical fusion rangefinder of the present disclosure.
Figure 3:
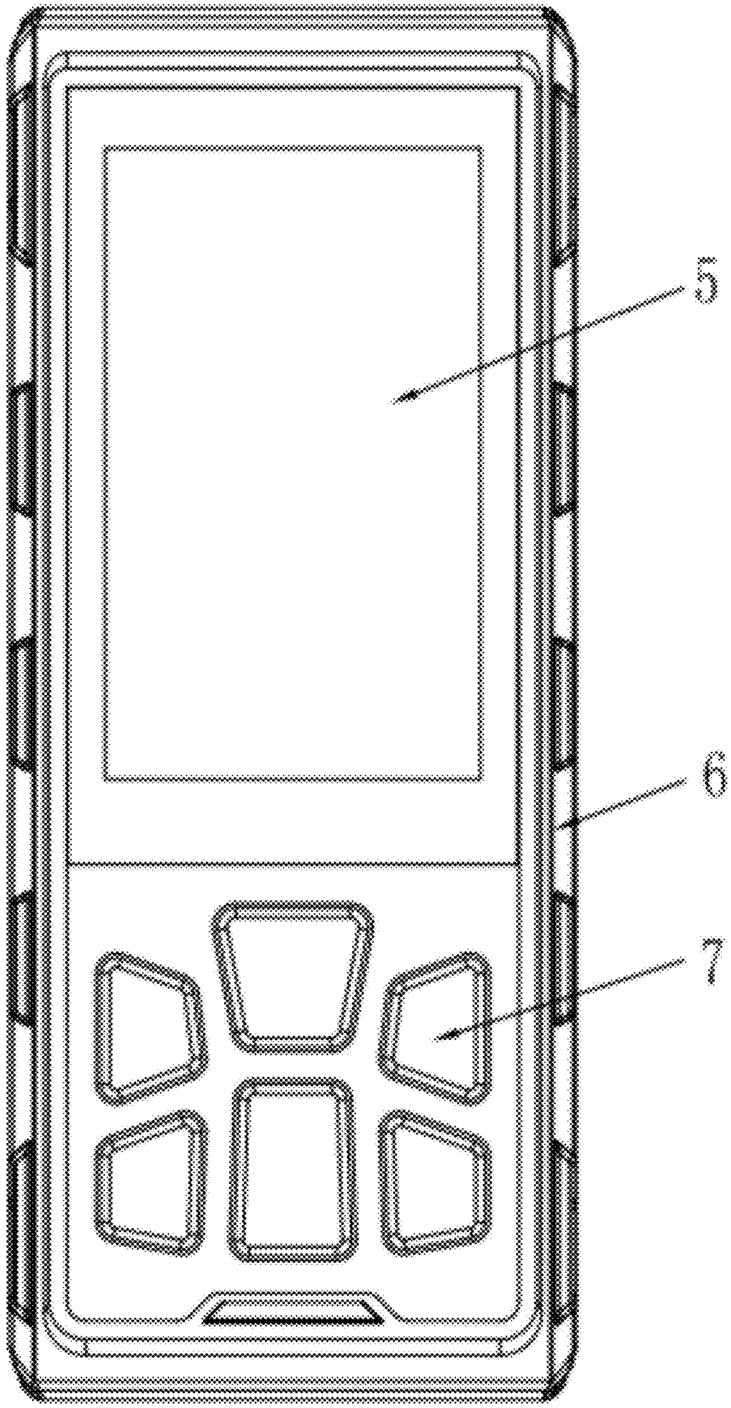
FIG. 3 illustrates a schematic structural diagram of a shell of the dual-optical fusion rangefinder of the present disclosure.
Figure 4:
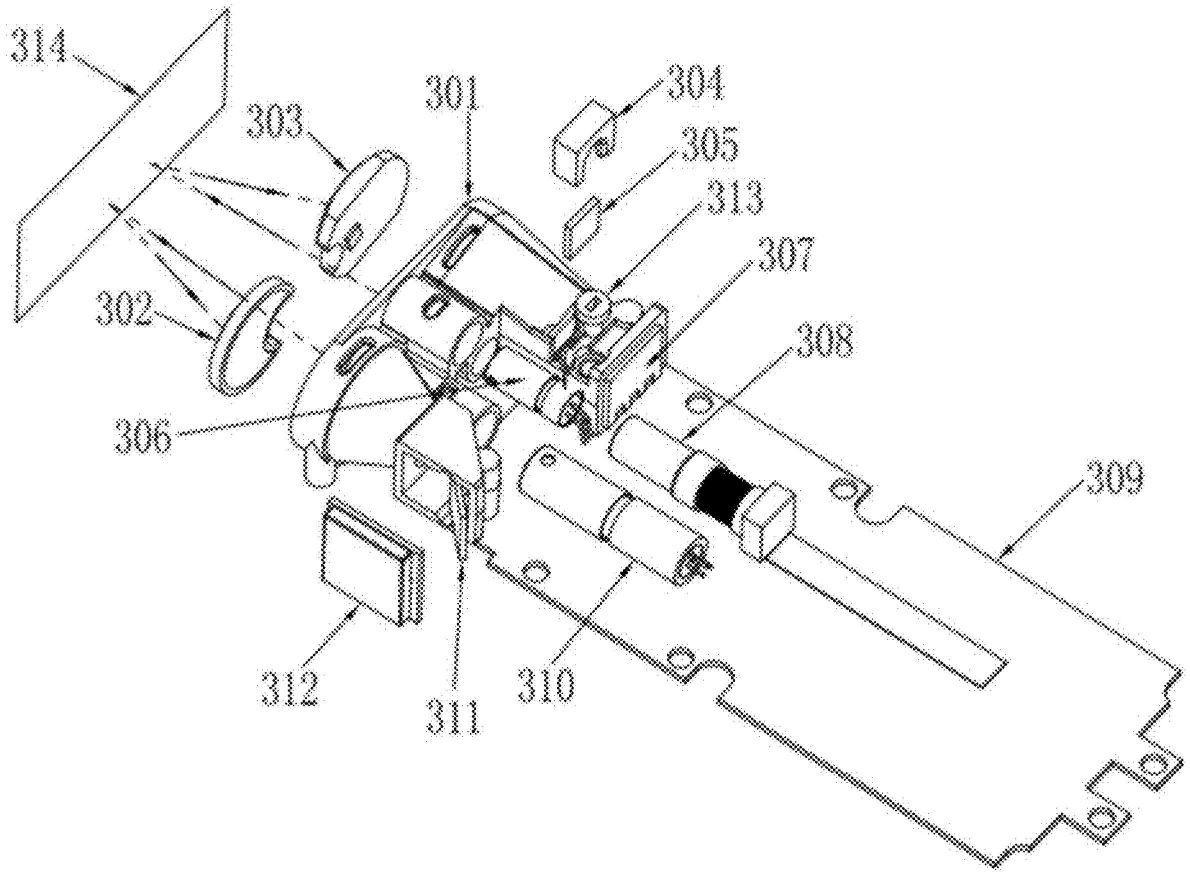
FIG. 4 illustrates a schematic structural diagram of an optical core assembly of the dual-optical fusion rangefinder of the present disclosure.
Figure 5:
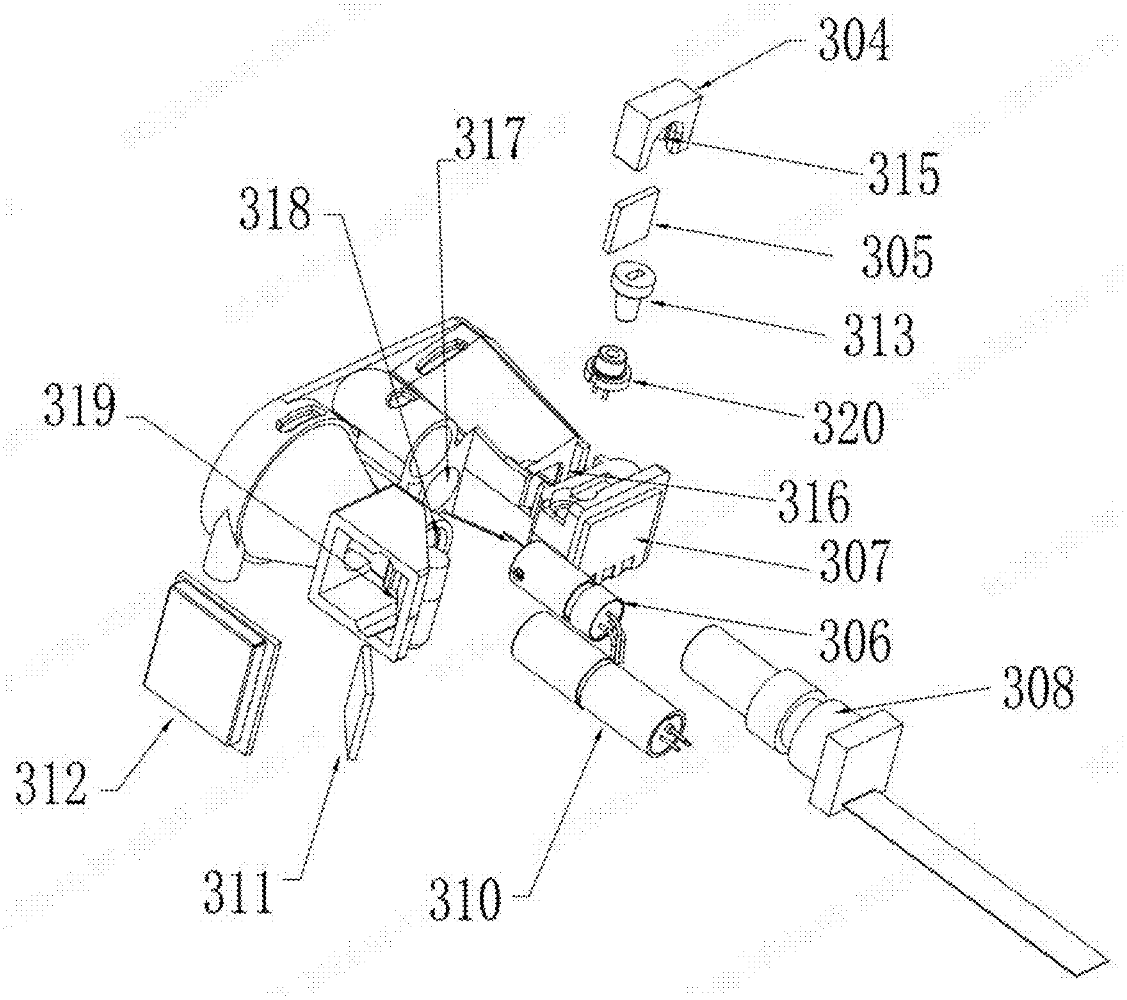
FIG. 5 illustrates a schematic structural diagram of the optical core assembly without a main control board of the dual-optical fusion rangefinder of the present disclosure.

As illustrated in FIG. 1 to FIG. 4, an embodiment provides a dual-optical fusion laser rangefinder, including a square housing, an optical core assembly 3, a protective lens 4, a touch control display module 5 and a button control board 11.

Specifically, the optical core assembly 3 and the button control board 11 are located in the square housing. The protective lens 4 is located at a front end of the square housing and positioned corresponding to the optical core assembly 3. The protective lens 4 is configured to transmit emitted lights and received lights. The touch control display module 5 is disposed on the square housing and is connected to the button control board 11, and the touch control display module 5 may include a touch control display screen (also referred to as touch control display panel or touch display panel). The button control board 11 is in control connection with the optical core assembly 3. The optical core assembly includes a phase laser ranging optical path unit and a pulse laser ranging optical path unit.

This rangefinder is capable of integrating pulse laser ranging and phase laser ranging optics, ensuring the ability to measure distances from 0.2 m to 5000 m on a single device. It also guarantees that the accuracy reaches the millimeter level within 200 m. Particularly in terms of structure, by integrating the two optical systems, the product's volume is compact, providing users with an enhanced experience.

The optical core assembly of the embodiment includes an optical bracket 301, a main control board 309, the phase laser ranging optical path unit and the pulse laser ranging optical path unit.

The optical bracket 301 is disposed on the main control board 309. The phase laser ranging optical path unit is located at a right side of the optical bracket 301.

In the embodiment, the phase laser ranging optical path unit includes: a phase reception mirror 303, a filter bracket 304, an optical filter 305, a phase laser emitter 306 and a phase receiver 307. The phase reception mirror 303 is fixed on a position of the main control board 309, which is located at a right side of a front end of the optical bracket 301. The optical filter 305 is fixed in a filter bracket groove 315 defined on the filter bracket 304, and the filter bracket 304 is pressed into an optical bracket groove 316 defined on the optical bracket 301. The phase laser emitter 306 is fixed in a phase laser emitter installment hole 317 defined on the optical bracket 301. The phase receiver 307 is attached to a rear end of the optical bracket 301. The phase laser emitter 306 and the phase receiver 307 are in control connection with the main control board 309.

In the embodiment, the phase laser emitter 306 emits a laser to a surface to be measured 314, the surface to be measured 314 diffusely reflects the laser onto a surface of the phase reception mirror 303, the phase reception mirror 303 focuses the laser and then transmits the laser to the optical filter 305, the laser penetrates the optical filter 305, and is received and transformed to an electrical signal by the phase receiver 307, and the electrical signal is transmitted to the main control board 309 for controlling. The phase laser emitter 306 is configured to emit visible green lights with wavelengths in a range of 500 nm to 535 nm or visible red lights with wavelengths in a range of 630 nm to 670 nm. A wavelength of the optical filter 305 is in a range of 500 nm to 535 nm or in a range of 630 nm to 670 nm.

In the embodiment, the pulse laser ranging optical path unit is located at a left side of the optical bracket 301. The pulse laser ranging optical path unit includes: a pulse laser emitter 310, a reflection mirror 311, a pulse reception mirror 302 and a pulse receiver 312. The pulse reception mirror 302 is fixed on a position of the main control board 309, which is located at a left side of the front end of the optical bracket 301. The pulse laser emitter 310 is fixed in a pulse laser emitter installment hole 318 defined on the optical bracket 301. The reflection mirror 311 is fixed on a 45-degree inclined edge 319 of the optical bracket 301. The pulse receiver 312 is fixed on the left side of the optical bracket 301.

The pulse laser emitter 310 emits a laser to the surface to be measured 314, the surface to be measured 314 diffusely reflects the laser onto a surface of the pulse reception mirror 302, the pulse reception mirror 302 focuses the laser and transmit the laser to the reflection mirror 311. The laser is reflected at a 45-degree angle by the reflection mirror 311 onto a surface of the pulse receiver 312. At last the laser is received and transformed to an electrical signal by the pulse receiver 312 and the electrical signal is transmitted to the main control board 309 for controlling. The pulse laser emitter 310 is configured to emit invisible lights with a wavelength of 905 nm.

In practical application, a camera 308 is provided on an edge of the optical bracket 301, which is closed to the phase laser emitter 306 when a ranging distance is long. The camera 308 is capable of capturing laser points with long distances. An inner light knob adjustment valve 313 and an inner laser tube 320 are arranged on the optical bracket 301. The inner light knob adjustment valve 313 is configured to control luminous flux from the inner laser tube 320 to the phase receiver 307. Through controlling the luminous flux from the inner laser tube 320 to the phase receiver 307 and combinations of the inner laser tube 320, the inner light knob adjustment valve 313 and the optical filter 305, a maximum range of the phase laser ranging optical path unit is improved to 200 m and an accuracy of the phase laser ranging optical path unit is controlled at the millimeter level.

In the embodiment, the protective lens 4 defines a pulse reception transparent area 401, a pulse emission transparent area 402, a phase emission transparent area 403, a camera transparent area 404 and a phase reception transparent area 405.

The square housing includes: a bottom shell 1, a front shell 6, a metal cover 8 and a USB protective cover 10. The optical core assembly 3 is fixed in the bottom shell 1 through optical core assembly lock screws 14. The button control board 11 is fixed in the front shell 6 through button control board lock screws 13. The metal cover 8 is fixed on a rear end of the front shell 6 through screws 9. The USB protective cover 10 is fixed on the metal cover 8 fixed on the rear end of the front shell 6. The touch control display module 5 is fixed on a surface of the front shell 6. The protective lens 4 is fixed on a front end of the front shell 6. The bottom shell 1 is connected to the front shell 6 through bottom shell lock screws 12.

The dual-optical fusion laser rangefinder provided by the present disclosure further includes: a lithium battery 2. The lithium battery 2 is fixed on the main control board 309 and is configured to provide power for the optical core assembly 3 and the touch control display module 5.

Finally, it should be noted that the optical core module 3 is configured to measure values, the touch control display module 5 is configured to display the values measured by the optical core module 3. The touch control display module 5 is equipped with touch functionality. Buttons 7 are configured to turn on and off the optical core module 3 and control the measurement of the optical core module 3.

The technical principles of the present disclosure have been described above in conjunction with specific embodiments. These descriptions are provided solely for the purpose of explaining the principles of the present disclosure and should not be construed in any way as limiting the scope of protection of the present disclosure. Based on the explanations provided herein, those skilled in the art would be able to conceive of other specific embodiments of the present disclosure without any inventive effort, and all such embodiments would fall within the scope of protection of the present disclosure.

What is claimed is:

1. A dual-optical fusion laser rangefinder, comprising:

a housing, an optical core assembly, a protective lens, a touch control display module and a button control board; wherein the optical core assembly and the button control board are located in the housing;

the protective lens is located at a front end of the housing, and positioned corresponding to the optical core assembly; and the protective lens is configured to transmit emitted lights and received lights;

the touch control display module is disposed on the housing and is connected to the button control board;

the button control board is in control connection with the optical core assembly; and the optical core assembly comprises an optical bracket, a main control board, a phase laser ranging optical path unit, and a pulse laser ranging optical path unit; the optical bracket is disposed on the main control board; and the phase laser ranging optical path unit and the pulse laser ranging optical path unit are disposed on the optical bracket and are arranged side-by-side along a width direction of the optical bracket;

the phase laser ranging optical path unit comprises: a first optical focusing element, a filter bracket, an optical filter, a phase laser emitter and a phase receiver; the first optical focusing element is fixed on the main control board at an end of the optical bracket facing towards a surface to be measured; the optical filter is fixed in a filter bracket groove defined on the filter bracket, and the filter bracket is pressed into an optical bracket groove defined on the optical bracket; the phase laser emitter is fixed in a phase laser emitter installment hole defined on the optical bracket; the phase receiver is attached to an end of the optical bracket that is facing away from the surface to be measured; and the phase laser emitter and the phase receiver are in control connection with the main control board;

the pulse laser ranging optical path unit comprises: a pulse laser emitter, a reflection mirror, a second optical focusing element and a pulse receiver; the second optical focusing element is fixed on the main control board at the end of the optical bracket facing towards the surface to be measured; the pulse laser emitter is fixed in a pulse laser emitter installment hole defined on the optical bracket; the reflection mirror is fixed on a 45-degree inclined edge of the optical bracket; and the pulse receiver is fixed on the optical bracket; and the optical core assembly further comprises a light adjustable element and an inner laser tube disposed on the optical bracket, and the light adjustable element is configured to control luminous flux from the inner laser tube to the phase receiver.

2. The dual-optical fusion laser rangefinder as claimed in claim 1, wherein the phase laser emitter is configured to emit a laser to a surface to be measured, to thereby enable the surface to be measured to diffusely reflect the laser onto a surface of the first optical focusing element; the first optical focusing element is configured to focus the laser and transmit the laser to the optical filter; and the phase receiver is configured to receive the laser penetrating the optical filter, transform the laser to an electrical signal, and transmit the electrical signal to the main control board for controlling.

3. The dual-optical fusion laser rangefinder as claimed in claim 2, wherein the phase laser emitter is configured to emit visible green lights with wavelengths in a range of 500 nanometer (nm) to 535 nm or visible red lights with wavelengths in a range of 630 nm to 670 nm; and a wavelength of the optical filter is in a range of 500 nm to 535 nm or in a range of 630 nm to 670 nm.

4. The dual-optical fusion laser rangefinder as claimed in claim 1, wherein the pulse laser emitter is configured to emit a laser to the surface to be measured, to thereby enable the surface to be measured to diffusely reflect the laser onto a surface of the second optical focusing element; the second optical focusing element is configured to focus the laser and transmit the laser to the reflection mirror; the reflection mirror is configured to reflect the laser at a 45-degree angle onto a surface of the pulse receiver; and the pulse receiver is configured to transform the laser to an electrical signal and transmit the electrical signal to the main control board for controlling; and the pulse laser emitter is configured to emit invisible lights with a wavelength of 905 nm.

5. The dual-optical fusion laser rangefinder as claimed in claim 1, wherein a camera is provided on an edge of the optical bracket adjacent to the phase laser emitter when a ranging distance is in a range of 10 meters (m) to 5000 m; and the camera is capable of capturing laser points with distances in a range of 10 m to 5000 m.

6. The dual-optical fusion laser rangefinder as claimed in claim 1, wherein the protective lens defines a pulse reception transparent area, a pulse emission transparent area, a phase emission transparent area, a camera transparent area and a phase reception transparent area.

7. The dual-optical fusion laser rangefinder as claimed in claim 1, wherein the housing comprises: a bottom shell, a front shell, a metal cover and a universal serial bus (USB) protective cover;

the optical core assembly is fixed in the bottom shell through optical core assembly lock screws;

the button control board is fixed in the front shell through button control board lock screws;

the metal cover is fixed on a rear end of the front shell through screws;

the USB protective cover is fixed on the metal cover fixed on the rear end of the front shell;

the touch control display module is fixed on a surface of the front shell; and the protective lens is fixed on a front end of the front shell.

8. The dual-optical fusion laser rangefinder as claimed in claim 1, wherein the dual-optical fusion laser rangefinder further comprises a lithium battery; and the lithium battery is fixed on the main control board and is configured to provide power for the optical core assembly and the touch control display module.

* * * * *